United States Patent [19]

Stursberg

[11] Patent Number: 5,787,566
[45] Date of Patent: Aug. 4, 1998

[54] METHOD AND APPARATUS FOR CUTTING FLAT STOCK

[75] Inventor: Bernd H. Stursberg, Ennepetal, Germany

[73] Assignee: Peddinghaus Corporation, Bradley, Ill.

[21] Appl. No.: 768,988

[22] Filed: Dec. 18, 1996

[51] Int. Cl.⁶ ............... B23P 23/04; B23Q 5/44; B23B 47/00

[52] U.S. Cl. .............. 29/558; 29/26 A; 219/121.18; 266/58; 408/43; 409/202; 409/212

[58] Field of Search ............... 29/33 P, 56.5, 29/26 A, 26 R, 558, 559; 408/31, 24, 42, 43; 409/202, 219, 212; 219/121.35, 121.5, 121.18, 121.67; 266/67, 58

[56] References Cited

U.S. PATENT DOCUMENTS

| | | | |
|---|---|---|---|
| 2,892,388 | 6/1959 | Daugherty | 409/202 |
| 5,100,270 | 3/1992 | Dowdle et al. | 409/202 X |
| 5,157,822 | 10/1992 | Farley | 29/26 A |
| 5,294,220 | 3/1994 | Ohmserdt et al. | 409/219 X |
| 5,429,461 | 7/1995 | Mukhervee et al. | 29/33 P X |
| 5,468,101 | 11/1995 | Shoda | 409/202 |
| 5,524,328 | 6/1996 | Hardesty | 29/56.5 |

OTHER PUBLICATIONS

FDB heutige Bauart (FDB current design) Fig. 1.
8–Page Brochure entitled "Peddinghaus Peddimat Bohr–under Brennanlagen".

*Primary Examiner*—William R. Briggs
*Attorney, Agent, or Firm*—Rockey, Milnamow & Katz, Ltd.

[57] ABSTRACT

A method and apparatus are provided for cutting through flat stock with at least one cutting tool, such as a torch, drill, or the like. The stock is supported in a plane defined by X and Y axes of a mutually orthogonal X, Y, and Z-axis coordinate system. The stock is supported for movement along the X-axis. At least one tool is supported over the flat stock for movement along the Z-axis and for movement along the Y-axis. The stock is moved along the X-axis. The tool is moved along the Y-axis. The tool is moved along the Z-axis toward the stock and is operated to cut the stock. If the tool is a cutting torch, the stock may be moved along the X-axis, and/or the cutting torch may be moved along the Y-axis, to define a desired cutting path.

2 Claims, 3 Drawing Sheets

METHOD AND APPARATUS FOR CUTTING FLAT STOCK

TECHNICAL FIELD

This invention relates to methods and apparatus for cutting flat stock, such as a metal plate or sheet, with one or more tools, such as torches, drills and the like.

BACKGROUND OF THE INVENTION AND TECHNICAL PROBLEMS POSED BY THE PRIOR ART

Flat stock, such as steel sheet or plate, is conventionally cut with drills, plasma torches, and/or oxyacetylene torches. The drills are typically operated to bore through the flat stock at desired locations. The cutting torches are used to cut desired exterior profile or interior profile configurations in the flat stock.

Contrary to the teachings of the prior art, the present invention recognizes the desirability of providing an improved system in which one or more cutting torches are arranged to cut flat stock on a support over a slit or other void region, and in which a plurality of drills could be employed for operation in the same slit.

In one typical, conventional machine, the flat stock is clamped in a stationary position on a support frame. The torches and/or drills are mounted on a carriage which can move in two mutually orthogonal directions over the flat stock. After a particular tool is positioned at a desired location, the tool can be operated to cut through the flat stock. If the tool is a drill, the rotating drill can be moved vertically down into the flat stock at a fixed located on the flat stock. If the tool is a torch, the torch can be moved downwardly to a proper cutting height relative to the flat stock, and then the carriage on which the torch is mounted can be moved to carry the operating torch in any desired path across the flat stock. This type of apparatus requires a relatively large amount of floor space. Pieces that are cut out of the flat stock by the torch must be picked up from the stock support area.

Another type of conventional machine provides the cutting tools, such as the drills and torches, on a fixed frame over the flat stock. The flat stock is clamped to a movable carriage which can move in two mutually orthogonal directions so as to permit a point on the flat stock to be positioned under the tool. When a torch is employed, the flat stock carriage can be moved so that the cutting torch cuts along the desired path.

Typically, these conventional machines employ clamps to clamp the flat stock to a support. The portions of the flat stock under, or close to, the clamps cannot be cut or drilled because it is not possible to drill in or near the clamped areas. Further, when a cutting torch is used to cut a smaller piece from a larger flat stock, the smaller piece cannot include any portion of the clamped area. Thus, this can result in an undesirable waste of material that might otherwise be usable. It would therefore be desirable to provide an improved system in which every portion of the flat stock could be cut as desired and could be a part of a finished piece.

When conventional machines are employed to cut one or more smaller pieces from a larger flat stock, care must be taken to insure that the remaining portion of the flat stock (the "skeleton") is large enough to maintain rigidity of the stock during the cutting process and as smaller pieces are cut away. Failure to maintain a sufficiently strong skeleton leads to lateral movement, deformation, sagging, etc., and this prevents proper cutting of the finished pieces from the larger flat stock. The need to maintain a large skeleton when cutting flat stock with conventional machines contributes to a greater waste of flat stock material. Thus, it would be desirable to provide an improved system in which large, left over skeleton portions of the flat stock would not be required to hold the flat stock together during the cutting process.

Conventional flat table plasma torch cutting machines typically employ ceramic cones underneath the flat stock to support the flat stock. Portions of the cones are burned away as the plasma torch cuts the flat stock, and this generates much heat and smoke. Typically, very large fans are required to remove the smoke. It would be desirable to provide an improved process in which the flat stock can be cut along any desired path, but in the absence of support components so as to eliminate the smoke that the burning of such support components would produce.

It would also be desirable to provide an improved system in which the cutting torches and drills could be aligned to provide a more compact design and be operated over a common slit or other void region in a more efficient manner.

The present invention provides an improved method and apparatus for cutting flat stock which can accommodate designs having the above-discussed benefits and features.

SUMMARY OF THE INVENTION

The present invention provides a novel method and apparatus for more effectively and efficiently cutting flat stock, such as steel sheet or plate. The method and apparatus are especially suitable for use with cutting tools such as drills and torches.

In a preferred form of the invention, the apparatus and method include the arrangement of the cutting torches and drills along a single line for operation over a common slit defined beneath the flat stock. The preferred form of the system permits the elimination of certain support rollers heretofore employed while at the same time providing an improved system for supporting the flat stock during both drilling and torch cutting.

The method and apparatus of the present invention eliminates or reduces waste. The method and apparatus also provide smaller cut-out pieces of the flat stock at one region of the apparatus where the pieces can be automatically removed.

The method and apparatus can be used with oxyacetylene torches and plasma torches in a way that does not burn material other than the flat stock being cut. This substantially reduces smoke and heat generation.

The present invention apparatus can be provided in an area which is smaller than that of conventional machines for processing the same size flat stock.

According to one aspect of the invention, a method is provided for cutting through flat stock with cutting tools, such as torches, drills, or the like. The method includes the step of supporting the stock in a plane defined by the X-axis and Y-axis of a mutually orthogonal X, Y, and Z-axis coordinate system. The flat stock is supported to accommodate its movement along the X-axis.

According to the method, at least one drill and torch are supported over the workpiece along the Y-axis for movement along the Z-axis (perpendicular to the flat stock) and for movement along the Y-axis (parallel to, and across the width of, the flat stock).

The flat stock is then moved along the X-axis. Simultaneously, or subsequently, the tool is moved along the Y-axis. The tools can then be moved in the Z-axis toward the stock and operated to cut the stock. Some Z-axis movement of the tool could also occur before or during movement of the tool along the Y-axis and X-axis.

When using the drill, the drill is rotated, and the drill is moved in the Z-axis downwardly through the flat stock.

When using the torch, the torch is moved downwardly to the appropriate cutting height above the flat stock. Then the flat stock may be moved along the X-axis and/or the torch may be moved along the Y-axis so that the torch cuts along a desired path. The flat stock can be moved in either of the two opposite directions along the X-axis, and the torch can be moved in either of the two opposite directions along the Y-axis. This permits complex shapes to be cut from the flat stock.

In a preferred form of the invention method and apparatus, a plurality of cutting torches and drills are arranged along a single line and are operated over a common slit defined beneath the flat stock.

If desired, another piece of flat stock can be welded on to the trailing end of the first piece of flat stock to permit the processing of a longer, composite sheet.

According to another aspect of the invention, a novel apparatus is provided for cutting through flat stock with cutting tools, such as torches, drills, or the like. The apparatus includes a support for supporting the stock in a plane defined by X and Y axes of a mutually orthogonal X, Y, and Z-axis coordinate system. The stock is supported for movement along the X-axis. In the preferred embodiment, the support includes a plurality of spaced-apart rollers.

The apparatus also includes a frame or support for a carriage holding at least one drill and one torch along the Y-axis over the flat stock. They are supported for movement along the Z-axis and for movement along the Y-axis.

In a preferred embodiment, a carriage supports a plurality of drills and a plurality of torches along a single line on the Y-axis that is transverse (perpendicular) to the X-axis path defined by the stock support rollers. The tool carriage is movable in either of the two opposite directions along the Y-axis on the support or frame. In the preferred embodiment, the drills and cutting torches are operable on the flat stock over a common, narrow slit or void region. Each tool on the carriage is movable vertically upwardly or downwardly along the Z-axis relative to the carriage and to the flat stock. In the preferred embodiment, suitable drive mechanisms are provided for driving the carriage along the frame over the flat stock and for raising and lowering each tool on the carriage.

A flat stock drive mechanism is provided for engaging the flat stock and moving it along the stock support under the tools. In the preferred embodiment, a single rotating drive roller assembly is engaged with the bottom surface of the flat stock to move the stock in the X-axis direction. Preferably, stock hold-down rollers are also provided in vertical alignment with the drive roller assembly to engage the upper surface of the flat stock over the drive roller assembly.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

DESCRIPTION OF THE PREFERRED EMBODIMENT

While the method and apparatus of this invention are susceptible of embodiment in many different forms, this specification and the accompanying drawings disclose only one specific form as an example of the invention. The invention is not intended to be limited to the embodiment so described, however. The scope of the invention is pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, and sold in an orientation other than that described.

Figures illustrating the apparatus show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

Figure 1:
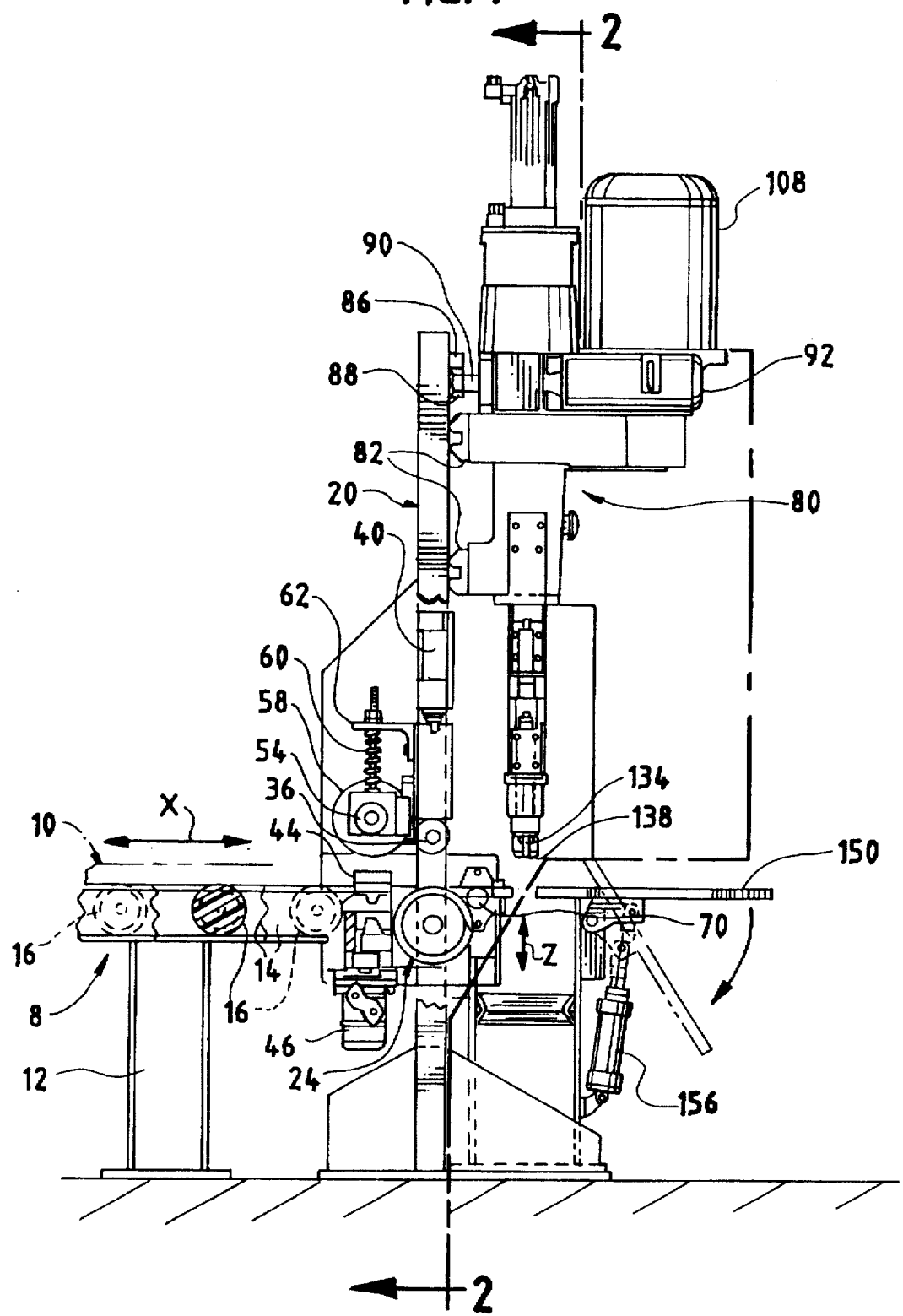
FIG. 1 is a fragmentary, side elevational view of the apparatus of the present invention.

FIG. 1 shows a platform support 8 for flat stock 10, such as a sheet or plate of steel. The support 8 includes one or more structural columns or posts 12 and horizontal members 14 supported on the columns 12. Mounted to the horizontal members 14 are a plurality of spaced-apart rollers 16 on which the flat stock 10 is supported for movement in either of two opposite directions which are illustrated in FIG. 1 by the double-headed arrow labeled X and which define an X-axis of a mutually orthogonal X, Y, and Z-axis coordinate system.

The apparatus includes a vertical frame 20. The frame 20 supports a flat stock drive mechanism or feed mechanism which, in the preferred embodiment, includes a single drive roller assembly 24 at the end of the stock support 8 upstream of drills and torches described in detail hereinafter. The stock support 8 is preferably incorporated in an infeed or entry conveyor which is synchronously driven with the drive roller assembly 24. The roller assembly 24 extends parallel to the Y-axis as shown in FIG. 3, and the roller assembly 24 includes a plurality of spaced-apart, larger diameter portions 26 on a smaller diameter shaft 28. The larger diameter portions 26 engage the bottom surface of the flat stock 10 as shown in FIG. 2.

The roller assembly 24 is rotated about the longitudinal axis of the shaft 28 by a drive motor 30. The motor 30 is mounted to the frame 20 and is connected with a gear drive 32 (FIGS. 2 and 3) to the shaft portion 28 of the roller assembly 24. The motor 30 and gear drive 32 may be of any suitable conventional or special design. For example, a suitable motor is sold under the brand name Brushless Servo R60 Series by Pacific Scientific, 4301 Kishwauhee Street, P.O. Box 106, Rockford, Ill. 61105, U.S.A.

While the present invention contemplates the use of an appropriate mechanism for moving the flat stock 10 along the X-axis, and while the particular mechanism illustrated for the preferred embodiment includes a roller assembly 24 engaging the bottom surface of the flat stock 10, the detailed design and specific structure of the operatively engaged gear drive 32 and motor 30 form no part of the present invention.

Figure 2:
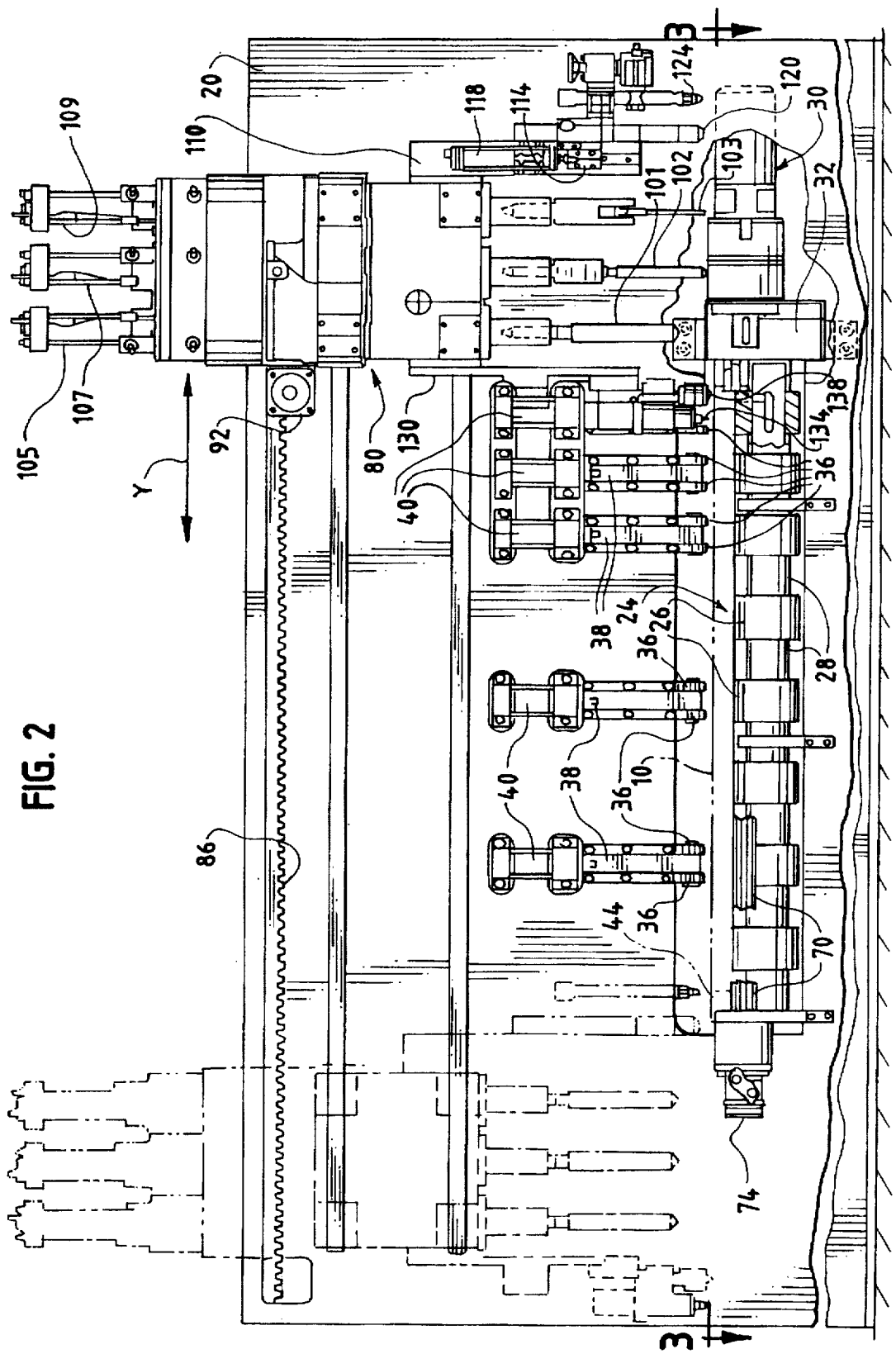
FIG. 2 is a cross-sectional view taken generally along the various planes 2—2 in FIG. 1 with portions of a vertical plate cut away to show certain structures behind the plate.
Figure 3:
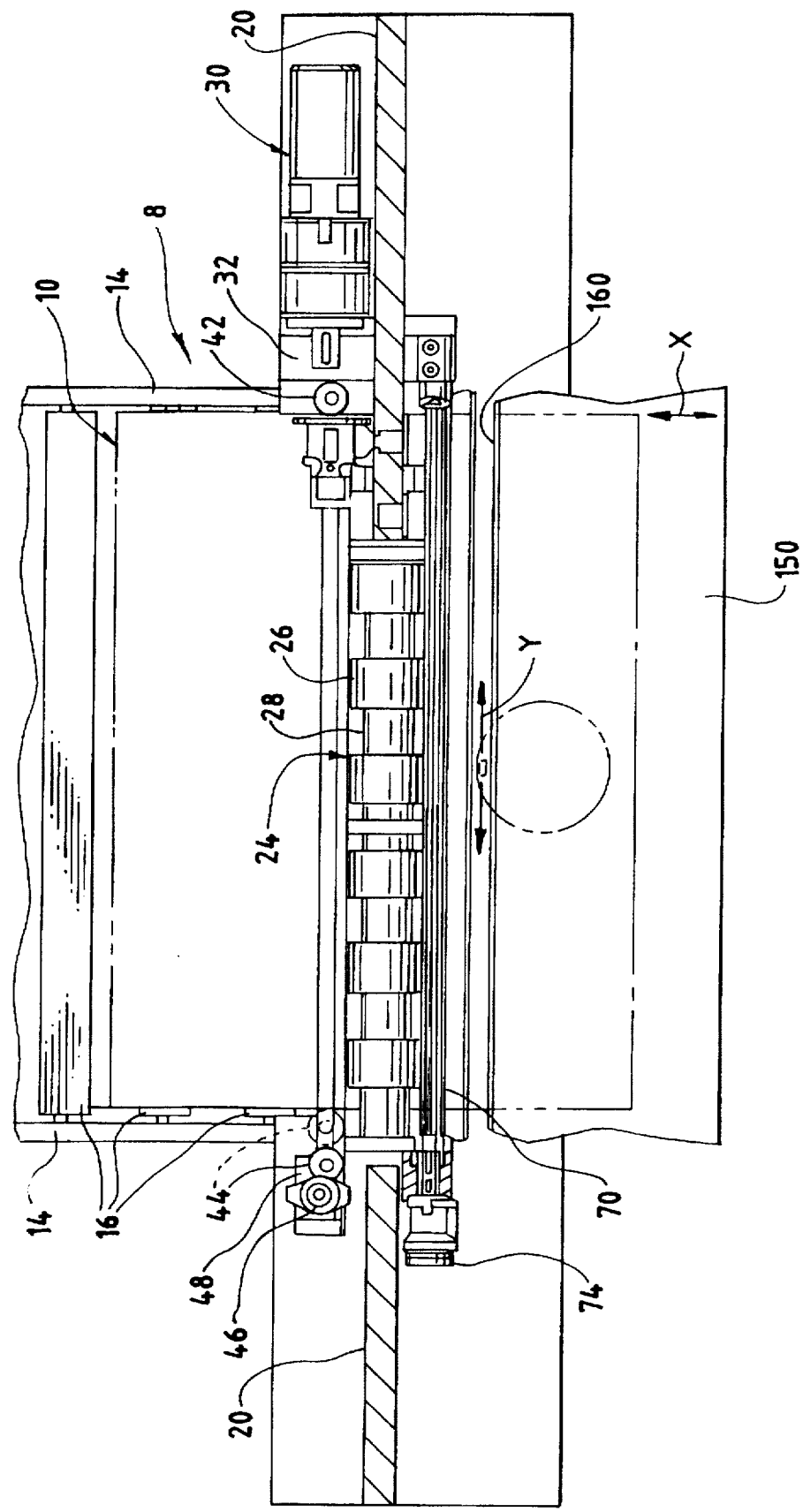
FIG. 3 is a cross-sectional view taken generally along the plane 3—3 in FIG. 2.

The flat stock 10 is held against the roller assembly 24 by a plurality of hold-down rollers 36 (FIGS. 1 and 2). The rollers 36 are arranged in pairs on vertically reciprocable members 38 which are each connected to a pneumatic piston-cylinder actuator 40 mounted to the frame 20. In FIG. 2, the actuators 40 are each shown in the retracted position elevating the rollers 36 above, and out of contact with, the top surface of the flat stock 10. One suitable type of hydraulic actuator is the Model No. H2, Style MS2 as manufactured by Parker Hannifin, which has an office at 501 South Wolf Road, Des Plaines, Ill., U.S.A.

When the flat stock 10 is conveyed over the roller assembly 24 and driven in the X-axis thereby, the actuators 40 are operated to lower the rollers 36 against the top surface of the flat stock 10 to hold the flat stock 10 in engagement with the enlarged diameter portions 26 of the roller assembly 24.

In an alternate preferred embodiment (not illustrated), just two hold-down rollers 36 may be provided—one at each end of the roller assembly 24. The number and arrangement of the hold-down rollers 36 are optional.

The flat stock 10 is also preferably guided and held laterally in position adjacent the roller assembly 24. To this end, a two-piece roller 42 is mounted for rotation about a vertical axis as shown in FIGS. 2 and 3 on the right-hand edge of the flat stock 10. The flat stock 10 is forced against the roller 42 by means of a movable roller 44 shown in FIGS. 2 and 3 at the left-hand side of the flat stock 10. The roller 44 is rotatable about a vertical axis and is movable toward the other clamping guide roller 42 by means of a hydraulic motor 46 which drives a carriage 48 to which the roller 44 is mounted by means of a shaft 50.

FIG. 3 illustrates an inwardly moved position of the left-hand clamping guide roller 44 in phantom as indicated by dashed lines. The lateral adjustment capability of the clamping guide roller 44 permits the apparatus to accommodate flat stock 10 of varying widths. The clamping guide roller 44 insures that one edge of the flat stock 10 will always be located at a reference position against the right-hand roller 42 as illustrated in FIGS. 2 and 3. Measurements across the width of the flat stock 10 for purposes of controlling the position of the cutting tools (described in detail hereinafter) are taken from the reference position defined by the roller 42 which is fixed with respect to the Y-axis.

While one aspect of the present invention contemplates an embodiment in which a clamping guide roller 44 is employed to maintain the flat stock 10 against a fixed Y-axis reference point (e.g., roller 42), the detailed design and specific structure of the rollers 42 and 44, carriage 48, and motor 46 form no part of the present invention. Any suitable conventional or special motor, carriage, and rollers may be employed. One suitable hydraulic motor 46 is designated Model 110, Series LSHT and is manufactured by Parker Hannifin, which has an office at 501 South Wolf Road, Des Plaines, Ill., U.S.A.

The position of the flat stock 10 along the X-axis is registered by a rotary encoder 54 which is driven by a wheel 58. The wheel 58 engages the top surface of the flat stock 10 and is rotated by the movement of the flat stock 10. The encoder 54 and wheel 58 are mounted as an assembly which is biased downwardly against the top surface of the flat stock 10 by means of a spring 60 acting between the assembly and a bracket 62 mounted to the vertical support frame 20.

As illustrated in FIG. 3, the encoder wheel 58 is toothed and is located adjacent the clamping guide roller 42 along one edge of the flat stock 10. The toothed surface of the wheel 58 ensures that the wheel 58 will not slip as it is engaged, and rotated, by the flat stock 10. The wheel 58 may have a circumference of one meter, for example, so that one rotation of the wheel corresponds to a one meter linear movement distance of the flat stock 10 along the X-axis.

The wheel 58 is employed in a feedback control system. Such a wheel and feedback control system may be of conventional design, such as employed in the Model TDK1000/3 drilling machine manufactured by Peddinghaus Corporation, 300 North Washington Avenue, Bradley, Ill. 60915, U.S.A.

Any suitable conventional, or special encoder 54 may be employed with a suitable control system, the details of which form no part of the present invention.

In an alternate embodiment (not illustrated), the wheel 58 and encoder 54 may be positioned in a cutout of the frame 20 directly over the roller assembly 24. The particular location is optional and forms no part of the invention.

As shown in FIGS. 1, 2, and 3, a mill cutter 70 is located adjacent the exit side of the roller assembly 24. The mill cutter 70 is a cylindrical member with longitudinally extending cutting flutes which engage the bottom surface of the flat stock 10 after the flat stock 10 passes over the roller assembly 24. The mill cutter 70 is rotated by a hydraulic motor 74 (FIGS. 2 and 3). The cutter 70 removes material, such as dross, which results from action of the cutting tools and which projects downwardly from the flat stock bottom surface. One suitable type of cutter drive motor 74 is the Model 060 hydraulic motor manufactured by Parker Hannifin, which has an office at 501 South Wolf Road, Des Plaines, Ill., U.S.A. The detailed design and operation of such a motor 74 and mill cutter 70 form no part of the present invention.

A tool support carriage 80 is mounted to the frame 20 as illustrated in FIGS. 1 and 2. The carriage 80 includes a pair of spaced-apart ways or linear bearings 82 which are mounted to the frame 20 to accommodate movement of the carriage 80 along the Y-axis. A suitable linear bearing way structure is the type sold by Star Linear Systems which has an office at 432 Southern Pine Boulevard, Charlotte, N.C. 28273.

The frame 20 also carries a rack 86 which is spaced above, and which is parallel to, the linear bearings 82. The rack 86 has gear teeth oriented horizontally which are engaged with a drive gear 88 mounted to a shaft 90 projecting from a carriage drive motor 92 (FIGS. 1 and 2) on the carriage 80. One suitable type of gear and rack assembly is the six diametrical pitch assembly manufactured by Boston Gear which has an office at 14 Hayward Street, Quincy, Mass. 02171, U.S.A. A suitable type of carriage drive motor 92 is the Model R60 sold by Pacific Scientific, which has an office at 529 Main Street, Charlestown, Mass. 02129, U.S.A. The detailed design and operation of such a carriage drive system form no part of the present invention.

In an alternate preferred embodiment (not illustrated), the rack 86 can be mounted to the top of the frame 20 with the rack teeth oriented vertically (instead of horizontally as illustrated in FIGS. 1 and 2). The drive gear 88, shaft 90, and motor 92 can be oriented vertically (i.e., 90° from the position illustrated in FIG. 1). The particular orientation of the rack 86 and engaged drive components is a matter of design choice and forms no part of the present invention.

The carriage 80 carries a first drill 101, a second drill 102, and a third drill 103. A greater or lesser number of drills could be provided. The drills preferably have different diameters so that at least three different diameter bores can be drilled in the flat stock 10 without having to change drills. The drills 101, 102, and 103 may be spindle drills such as used in the TDK 1000 drilling machine manufactured by Peddinghaus Corporation which has an office at 300 North Washington Avenue, Bradley, Ill. 60915, U.S.A. Other suitable conventional or special drills may be employed. The detailed design of such drills forms no part of the present invention.

Each of the drills 101, 102, and 103 is rotated about its longitudinal axis by means of a gear system (not visible) driven by an electric motor 108 (FIG. 1). The motor 108 and connecting drive gear system may be of any suitable conventional or special design, the detailed construction and operation of which form no part of the present invention.

Each drill, when operated, is moved downwardly against and through the flat stock 10 by a positioner, such as the hydraulic piston-cylinder actuator 105 associated with the drill 101, the hydraulic piston-cylinder actuator 107 associated with the drill 102, and the hydraulic piston-cylinder actuator 109 associated with the drill 103. Any suitable special or conventional hydraulic cylinder may be employed for this purpose. One suitable hydraulic actuator that may be employed is Model No. 2H sold by Peddinghaus Corporation, 300 North Washington, Bradley, Ill. 60915, U.S.A.

Mounted to one side of the carriage 80 is a torch support frame 110. Mounted for vertical reciprocation on the support frame 110 is a torch carriage 114. The torch carriage 114 is connected to a piston rod of a hydraulic piston-cylinder actuator 118 which is mounted to the torch support frame 110. Mounted to the carriage 114 is a plasma torch 120 and an oxyacetylene torch 124. One type of oxyacetylene torch 124 that may be employed is the Model MT200 manufactured by Victor, which has an office at Airport Road, Denton, Tex. 76205, U.S.A. A plasma torch that may be employed is the Model HT2000 manufactured by Hypotherm, Etna Road, Box A-10, Hannover, N.H. 03755, U.S.A. The detailed design and operation of the torches form no part of the present invention.

The torches are positioned vertically at the required height for proper cutting operation by the actuator 118 or other suitable positioner. One suitable actuator 118 is the Model No. 2A manufactured by Parker Hannifin which has an office at 501 South Wolf Road, Des Plaines, Ill., U.S.A.

At the end of the carriage 80 (FIG. 2), opposite the end to which the torches 120 and 124 are mounted is a mill cutter writing assembly comprising a vertical support plate 130, an attached high-speed carbide mill cutter 134 (FIGS. 1 and 2), and a mill cutter height control sensor 138 (FIGS. 1 and 2). The high-speed carbide mill cutter 134 is used to write part numbers or other indicia on the top surface of the flat stock 10. It moves in the Y-axis with the carriage 80. By controlling movement of the carriage 80 along the Y-axis with the movement of the flat stock along the X-axis, the desired numbers or other indicia can be engraved. The height control sensor 138 may be of any suitable conventional or special design for sensing the distance between the sensor and the top of the flat stock 10 so that the height of the associated cutter 134 can be controlled. A suitable conventional or special control system and vertical positioning system for the high-speed carbide mill cutter 134 is provided to adjust the height of the cutter 134 as necessary for engraving, and the specific design and operation of such systems form no part of the present invention.

In an alternate preferred embodiment (not illustrated), the mill cutter 134 may be located between the first drill 101 and second drill 102. The use of the mill cutter 134 is optional, and, if used, the cutter 134 may be mounted at any suitable location.

At the exit side of the apparatus, there is a tiltable, tipping table 150. The table 150 is operated to tilt (to the angled position shown in phantom by dashed lines in FIG. 1) by a hydraulic piston-cylinder actuator 156 which may be of any suitable conventional or special design, the detailed construction and operation of which forms no part of the present invention. The cut-out pieces from the flat stock 10 slide off of the tilted table 150 to a receiving bin (not illustrated).

In an alternate preferred embodiment (not illustrated), the table 150 may also be mounted between a pair of parallel, vertical side walls which each define a cam groove. A cam follower pin or roller can be provided on each lateral side of the table 150 for following the cam groove as the table is tilted and is also elevated between a lowered, tilted position and an elevated, horizontal position.

In other embodiments, the tiltable table 150 may be replaced, if desired, by a suitable fixed platform or by an exit conveyor system (not illustrated).

In the preferred embodiment of the apparatus, an automatic control system is preferably provided for controlling the movement of the tool support carriage 80 along the Y-axis and for controlling the movement of the flat stock 10 along the X-axis. To this end, the control system can be designed to receive the signal from the encoder 54, which signal corresponds to the X-axis position of a selected initial reference point on the flat stock 10. Suitable controls associated with the Y-axis drive system for the carriage 80 control the Y-axis movement of the cutting tools.

The flat stock 10 can be moved in either of the two opposite directions along the X-axis, and the tool carriage 80 can be moved in either of the two opposite directions along the Y-axis. The X-axis and Y-axis motions may be executed simultaneously to position a tool, such as a drill or torch, at a desired location relative to the flat stock. Before, during, or after the X-axis and Y-axis motions, the tool or tools can be moved vertically downwardly to bring them closer to the top surface of the flat stock 10 if desired. Ultimately, after the motions of the stock 10 along the X-axis and of the carriage 80 along the Y-axis have established a selected initial position, the tools can be further lowered along the Z-axis if or as necessary to cut the stock, and the operation of the tool can be initiated.

If a drill is being operated, then the carriage 80 and flat stock 10 are maintained stationary while the selected drill moves downwardly and bores through the flat stock 10. If the selected tool is a cutting torch, the torch is typically first operated at the initial location to cut through the flat stock 10, and then the flat stock 10 is moved along the X-axis, or the tool carriage 80 is moved along the Y-axis, or both the flat stock 10 and carriage 80 are moved simultaneously—depending upon the particular cutting path that is desired.

It will be appreciated that the flat stock 10 can be moved first in one direction along the X-axis, and then in the opposite direction along the X-axis, and similarly, the carriage 80 can be moved first in one direction and then in the opposite direction along the Y-axis. These movements may occur together, or sequentially, to produce geometric cutting paths, such as circles and polygons, or to produce more intricate, irregular cutting paths.

Below the line of torches and drills, there is a slit or void space 160 (FIG. 3) between the downstream end of the entry conveyor or support 8 and the upstream end of the exit table 150. Because the cutting can occur only at locations along a single line in the slit or void space beneath the cutting torches on the Y-axis, there are no support elements in that region of the apparatus that would be cut by the cutting torch and that would produce extra heat and smoke.

Because the flat stock 10 is held down by the hold-down rollers 36 directly over the drive roller assembly 24, there is no need for no additional clamps remaining fixed to portions of the top surface of the flat stock 10. Accordingly, substantially the entire surface of the flat stock 10 is available for cutting with the torches or drills.

As the processing of the flat stock 10 is completed by the apparatus of the present invention, the flat stock 10 is fed along the X direction out of the apparatus over the tilting table 150. Because the flat stock 10 ultimately always exits the apparatus in the same direction, it is possible to weld another piece of flat stock onto the trailing end of the first piece of flat stock. Thus, finished pieces can be made in lengths which are greater than the original length of a single piece of flat stock.

Because the apparatus of the present invention does not clamp the flat stock 10 to a movable frame which moves laterally or longitudinally, and because the apparatus does not include a tool support frame which moves longitudinally along a length of the flat stock (in the X-axis direction), the area required by the apparatus of the present invention is less than the area required by conventional machines.

It will be readily apparent from the foregoing detailed description of the invention and from the illustrations thereof that numerous variations and modifications may be effected without departing from the true spirit and scope of the novel concepts or principles of this invention.

What is claimed is:

1. A method for cutting through flat stock with cutting tools that include a torch and a drill, said method comprising the steps of:
   (A) supporting said stock for movement along the X-axis in a plane defined by the X and Y axes of a mutually orthogonal X, Y, and Z-axis coordinate system;
   (B) supporting said tools along said Y-axis over said flat stock for movement along said Z-axis and for movement along said Y-axis;
   (C) moving one of said tools along said Y-axis;
   (D) moving said one tool along said Z-axis toward said stock; and
   (E) moving said stock first in one direction along said X-axis and then in the opposite direction along said X-axis simultaneously the with of step operating said one tool to cut said stock.

2. A method for cutting through flat stock with cutting tools that include a torch and a drill, said method comprising the steps of:
   (A) supporting said stock for movement along the X-axis in a plane defined by the X and Y axes of a mutually orthogonal X, Y, and Z-axis coordinate system;
   (B) supporting said tools along said Y-axis over said flat stock for movement along said Z-axis and for movement along said Y-axis;
   (C) moving said stock along said X-axis;
   (D) moving one of said tools along said Z-axis toward said stock; and
   (E) moving said one tool in one direction along said Y-axis and then in the opposite direction along said Y-axis simultaneously with the step of operating said one tool to cut said stock.

* * * * *